(12) United States Patent
Krahnstöver (10) Patent No.: US 10,220,771 B2
(45) Date of Patent: Mar. 5, 2019

(54) METHOD AND DRIVER ASSISTANCE SYSTEM FOR ASSISTING A DRIVER OF A VEHICLE

(71) Applicant: VOLKSWAGEN AKTIENGESELLSCHAFT, Wolfsburg (DE)

(72) Inventor: Anna Zoe Krahnstöver, Ingolstadt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/542,363

(22) PCT Filed: Dec. 3, 2015

(86) PCT No.: PCT/EP2015/078522
§ 371 (c)(1),
(2) Date: Jul. 7, 2017

(87) PCT Pub. No.: WO2016/110365
PCT Pub. Date: Jul. 14, 2016

(65) Prior Publication Data
US 2018/0272929 A1    Sep. 27, 2018

(30) Foreign Application Priority Data
Jan. 8, 2015 (DE) .................. 10 2015 200 131

(51) Int. Cl.
*B60Q 1/18* (2006.01)
*B60Q 1/52* (2006.01)
*F21S 41/16* (2018.01)

(52) U.S. Cl.
CPC ............... *B60Q 1/525* (2013.01); *B60Q 1/18* (2013.01); *F21S 41/16* (2018.01); *B60Q 2400/50* (2013.01)

(58) Field of Classification Search
CPC ........ B60Q 9/008; B60Q 1/525; B60Q 5/006; B60Q 9/006; B60Q 5/005; B60Q 9/00; B60Q 9/007; B60Q 1/34
(Continued)

(56) References Cited

U.S. PATENT DOCUMENTS 9,727,820 B2 * 8/2017 Ono ...................... G08G 1/0112
9,760,782 B2 * 9/2017 Augst ................ G06K 9/00798
(Continued)

FOREIGN PATENT DOCUMENTS

DE    19905114 A1    8/2000
DE    10133869 A1    2/2002
(Continued)

*Primary Examiner* — Mark S Blouin
(74) *Attorney, Agent, or Firm* — Slayden Grubert Beard PLLC (57) ABSTRACT

The invention relates to a method for assisting a driver of a vehicle (7), wherein a probability of a collision with another traffic participant (8, 9) in the environment of the vehicle (7) is determined, wherein the determined probability is assigned to a probability class. In addition, a light emission (15), which produces a light distribution (10, 11) having characteristics reflecting the probability class on a roadway, is emitted by the vehicle (7) in accordance with the probability class. The invention further relates to a driver assistance system (6) for assisting a driver of a vehicle (7), and to a vehicle (7) having such a driver assistance system (6).

14 Claims, 5 Drawing Sheets

(58) Field of Classification Search
USPC .......................................................... 340/435
See application file for complete search history.

(56) References Cited

U.S. PATENT DOCUMENTS

| | | | | |
|---|---|---|---|---|
| 9,904,859 | B2 * | 2/2018 | Grauer | .................. G01S 17/107 |
| 9,919,741 | B2 * | 3/2018 | Kim | ..................... B62D 15/025 |
| 2006/0087416 | A1 | 4/2006 | Kumabe et al. | |

FOREIGN PATENT DOCUMENTS

| | | | | |
|---|---|---|---|---|
| DE | 10244205 | A1 | 3/2004 | |
| DE | 102008051591 | A1 | 4/2010 | |
| DE | 10 2009 009473 | A1 * | 8/2010 | ............. B60Q 1/085 |
| DE | 102009009472 | A1 | 8/2010 | |
| DE | 102009009473 | A1 | 8/2010 | |
| DE | 102012219572 | A1 | 4/2014 | |
| DE | 102013001276 | A1 | 7/2014 | |
| EP | 0443185 | A2 | 8/1991 | |
| EP | 1862989 | A2 | 12/2007 | |
| EP | 1659029 | B1 | 7/2008 | |
| EP | 1862989 | B1 | 7/2009 | |
| EP | 2295292 | A1 * | 3/2011 | ............. B60Q 1/085 |
| JP | 2008143505 | A | 6/2008 | |
| WO | 2007006606 | A1 | 1/2007 | |

\* cited by examiner

METHOD AND DRIVER ASSISTANCE SYSTEM FOR ASSISTING A DRIVER OF A VEHICLE

The present invention relates to a method and a driver assistance system for assisting a driver of a vehicle.

BACKGROUND

The concept of equipping vehicles with various driver assistance systems which assist the driver during driving of the vehicle is known. The aim of such driver assistance systems is, in particular, to detect and interpret the environment of the vehicle in order to identify hazardous situations, in particular those associated with a risk of collision, at an early stage and to assist the driver during his driving maneuvers. Driver assistance systems are thereby intended to assist the driver to avoid collisions completely if possible or to at least minimize the consequences of a collision as much as possible.

For example, collision warning systems which detect objects in the environment of the vehicle and alert the driver to those objects which pose a collision hazard are known. Such systems can, in particular, assist the driver during nighttime driving since, in this case, the illumination of the surroundings of the vehicle by the vehicle headlight system is lower than during daytime driving. For example, a system wherein objects which are located at a distance in front of the vehicle, which distance exceeds the range of the headlight system of the vehicle, are visualized on a display in the interior of the vehicle or via a head-up display is known for nighttime driving.

Furthermore, the concept of using the light emission of the headlight system for assisting the driver when driving at night is known. For example, a method for driver assistance comprising recording a scene in front of the vehicle by means of a camera and analyzing the traffic situation with the aid of the recorded image is known from WO 2007/006606 A1. If, during this method, traffic elements that indicate potential danger zones are determined by the analysis of the image, the headlight system of the vehicle is actuated in such a way that the potential danger zone is illuminated to a greater extent.

Furthermore, the concept of recording the area in front of the vehicle by means of a video camera and subsequently evaluating the recorded images to determine whether potential danger spots such as, for example, foreign objects are present is known from DE 199 05 114 A1.

If a potential danger spot is detected, the characteristic of the light beam is modified by the control apparatus for the headlight system of the vehicle so that said danger spot is illuminated in an intensified manner to allow it to be safely perceived by the driver. If it emerges during the evaluation of the images that evasive action should be taken by the driver, the characteristic of the light beam is adjusted by the control apparatus such that said light beam lights up the region in front of the vehicle over a wide area so that the driver has sufficient guidance for an evasive maneuver.

The concept of providing a system by means of which an object outside a vehicle can be detected is known from US 2006/0087416 A1. In addition, a route is indicated to a driver of the vehicle. If an object is detected the indicated route is modified such that it indicates a direction towards the detected object. In addition, a warning signal can be indicated in the altered route indicated.

Furthermore, a vehicle proximity warning system is known from EP 1 659 029 B1, wherein a vehicle detects other objects and illuminates an area on the roadway so that the other objects are informed of the presence of the vehicle at an early stage.

Finally, the process of capturing other traffic participants and detecting a risk of collision with these other traffic participants is known from DE 10 2009 009 473 A1. If a risk of collision is detected, a light signal is projected onto the roadway in front of the other captured traffic participants. As a result, the other traffic participants are made aware of the risk of collision.

SUMMARY

It is an object of the present invention to provide a method and a driver assistance system of the type mentioned above, which reduce the probability of a collision of the vehicle with other traffic participants.

This object is achieved according to the invention by a method having the features of claim 1 as well as a driver assistance system having the features of claim 10. Advantageous embodiments and further developments are set out in the dependent claims.

BRIEF DESCRIPTION OF THE DRAWINGS

The invention will now be explained in detail on the basis of exemplary embodiment with reference to the drawings, wherein.

DETAILED DESCRIPTION OF EMBODIMENTS

In one aspect of the inventive method, a probability of a collision with another traffic participant in the environment of the vehicle is determined, wherein the determined probability is assigned to a probability class. A light emission, which produces a light distribution having a characteristic reflecting the probability class on a roadway, is emitted by the vehicle in accordance with the probability class.

As a result of the method of the present aspect, a risk of collision can advantageously be indicated in a simple manner by the light distribution on the road, for the driver of the vehicle which produces the light distribution and, additionally, for other traffic participants. This can be advantageous, in particular in traffic situations, for example, during turning maneuvers at intersections, during which traffic participants can come from multiple directions. The driver of the vehicle can be made aware of an approaching traffic participant before he perceives the latter himself. Additionally, the driver is assisted during the assessment of whether a driving maneuver can still be executed before the other traffic participant has driven past. The inventive method makes a turning maneuver safer, in particular at intersections at which the view of a driver is impaired, for example by parked vehicles.

Within the context of the invention, the term 'light emission of the vehicle' denotes the way a light emission leaves a headlight of the vehicle at the last barrier between the headlight and the vehicle environment, i.e., the outer pane of the headlight. In this case, the characteristic which the light distribution obtains on the roadway is produced within the headlight. The light emission which produces the light distribution having the characteristic can, in this case, be produced by any desired components within the headlight.

'Traffic participants' within the context of the invention means all of the other traffic participants participating in the road traffic or located on a road or a footpath. In particular, other traffic participants also denotes other vehicles, cyclists and/or pedestrians.

In particular, the characteristic of the light distribution may in an embodiment be produced by a wavelength of the light emission so that the characteristic of the light distribution is its color. The color of the light emission leaving the headlight can, in this case, advantageously be very simply manipulated. In addition, the reaction of a driver can be controlled in a simple manner by the selection of the color of the light distribution. Colors, which are immediately understood to be warning colors can then be used for high probabilities of collisions, whilst colors which indicate a low probability of a collision to the driver can be selected for low probabilities of collisions. The inventive method is, in particular, configured to assist the driver during a particular driving maneuver.

This does not, however, release the driver from the obligation to check again himself whether the driving maneuver can actually be executed without risk, even in the case of a light distribution having a characteristic which indicates a low probability of a collision.

In one further embodiment, the probability of a collision is assigned to a first probability class if no other traffic participant is detected in the environment of the vehicle. If, on the other hand, another traffic participant is detected in the environment of the vehicle, the probability of a collision as a function of a parameter, which can be modified depending on the other traffic participant, is assigned to a second and/or third probability class. In this case, the probability of a collision is virtually zero if no other traffic participant is detected. However, since the possibility that a traffic participant is located in an area which is not covered by a detection space of a detection unit cannot be excluded, the uncertainty of a collision can remain. If another traffic participant is detected, the probability of a collision can be subdivided into two further probability classes in corresponding embodiments. In this case, this subdivision is dependent on a parameter which depends on the detected traffic participant and which can be modified. Such a parameter is, in particular, understood to be a parameter which can only be detected by the first vehicle if the second vehicle is present. The parameter can, for example, be directly produced by a device of the second vehicle. However, it can also be a parameter which relates to a relationship between the first and the second vehicle.

In particular, the parameter may comprise a distance of the detected traffic participant from the vehicle, wherein the probability of a collision is assigned to the second probability class if the distance is greater than a specified value, and/or is assigned to the third probability class if the distance is less than or equal to the specified value. In this case, the probability of a collision is all the less the greater the distance from the detected traffic participant is. However, as of a certain distance, a driving maneuver, for example a turning maneuver, should no longer be executed, as the probability of the collision is too high. The specified value of the distance may, in this case, for example within a range of 100 m and 50 m. In this case, the specified value may in another embodiment be a function of the speed of the other traffic participant. The specified distance is then all the smaller the lower the speed of the other traffic participant is.

In another embodiment, the parameter comprises the direction of movement of the detected traffic participant, wherein it is determined whether a predicted direction of movement of the detected traffic participant intersects the future direction of movement of the vehicle. If it is determined that the predicted direction of movement of the detected traffic participant does not intersect the future direction of movement of the vehicle, the probability is assigned to the second probability class. If it is determined that the predicted direction of movement of the detected traffic participant intersects the future direction of movement of the vehicle, the probability is assigned to the third probability class. In order to predict the direction of movement of the detected traffic participant, the speed or respectively a change of speed of the detected traffic participant may, for example, be considered. In addition, a frequency and/or color of the light emission of a lamp of the second vehicle may be considered in further embodiments. If the detected traffic participant indicates a turning maneuver by signaling before he reaches the vehicle, the probability of a collision is low since it is assumed that the other traffic participant will turn in front of the vehicle. If the speed of the detected traffic participant decreases at the same time as the signaling, this is another indication that the detected traffic participant will actually turn before he reaches the vehicle. The probability of a collision is then determined to be even lower.

In another embodiment of the method of the current aspect, the light emission has a first wavelength, with which a light distribution is produced on a roadway with a first color, if the probability of a collision has been assigned to the first probability class. The light emission has a second wavelength, with which a light distribution is produced on a roadway with a second color if the probability of a collision has been assigned to the second probability class. In addition, the light emission has a third wavelength, with which a light distribution is produced on a roadway with a third color if the probability of a collision has been assigned to the third probability class. The probability class can, as a result, be indicated to the driver of the vehicle in a simple manner. In particular, the first and the second wavelength are equal so that the first and the second probability classes are indicated by means of the same color.

In particular, the first color may in corresponding embodiments be green, the second color may be green, yellow or orange and the third color may be red. This is a particularly intuitive selection of colors which is already known to the driver and other traffic participants from road traffic. Green is thereby immediately associated with a low risk. Orange or yellow is associated with a medium risk, wherein the driver could indeed still execute a driving maneuver but should not do so for safety reasons. If the light distribution shows a red light, this is immediately associated with danger. The driver of the vehicle will therefore refrain from executing the planned driving maneuver. The first and second probability classes may, however, also have the same color green. As a result, the decision of whether or not he still executes the driving maneuver in the case of an orange or yellow light distribution is taken away from the driver. To this end, the specified value of the distance can then be selected so that the driving maneuver can, in any case, still be executed if the light distribution has the color green if the probability of a collision has been assigned to the second probability class.

Furthermore, a light signal may in an embodiment be projected into the light distribution, wherein the projected light signal depends on the color of the light distribution, i.e., on the determined probability. As a result, it can advantageously be indicated even more clearly to the driver of the vehicle whether a driving maneuver can be executed or not.

In another embodiment, the light signal represents an instruction to execute a driving maneuver if a green light distribution is produced on the roadway. This may, for example, be a turning arrow in the direction in which the driver of the vehicle would like to turn. If, on the other hand, an orange or red light distribution is produced on the roadway, the light signal can represent a warning prior to executing the driving maneuver. For example, a "cross" or writing, for example "STOP" or "WAIT", may be projected onto the roadway in embodiments. As a result, the driver is advantageously given an instruction about what to do next.

A second aspect further relates to a driver assistance system for assisting a driver of a vehicle. The driver assistance system comprises a determination unit, by means of which a probability of a collision with another traffic participant in the environment of the vehicle can be determined, and by means of which the determined probability can be assigned to a probability class. In addition, the driver assistance system comprises a headlight system. The headlight system can be actuated by means of a control device in accordance with the probability class such that a light emission, which produces a light distribution having a characteristic reflecting the probability class, can be emitted. The driver assistance system is suitable for carrying out the method as discussed in the preceding. It therefore has all the advantages of the inventive method.

In one embodiment, the driver assistance system has a detection unit, by means of which it is possible to detect whether another traffic participant is located in the environment of the vehicle. The probability of a collision can be assigned to a first probability class with the determination unit, if no other traffic participant is detected in the environment of the vehicle, and/or the probability of a collision as a function of a parameter which can be modified depending on the other traffic participant can be assigned to a second and/or third probability class with the determination unit, if another traffic participant is detected in the environment of the vehicle.

Furthermore and in another embodiment, a light emission of a wavelength in accordance with the probability class can be emitted by means of the headlight system so that the characteristic of the produced light distribution comprises its color. The color of a light emission can, in this case, be manipulated in different ways. For example, the light emitted by the light sources can already be colored. Alternatively, a wavelength emitted by a light source can be modified by color filters so that the light leaving the headlight has the desired wavelength.

In a further embodiment, the headlight system comprises a laser projection unit. This can produce the characteristic and/or the color of the light distribution. A variable light distribution can advantageously be produced by, e.g., a laser projection unit, into which light distribution any desired patterns and shapes can be projected.

The invention in another aspect further relates to a vehicle having such a driver assistance system.

Figure 1:
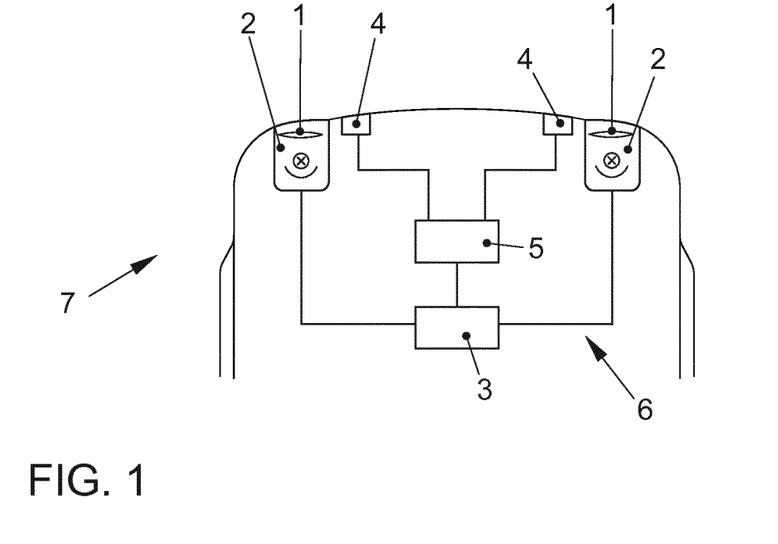
FIG. 1 schematically shows the construction of an exemplary embodiment of the inventive driver assistance system as well as an arrangement of the driver assistance system in a vehicle.

An exemplary embodiment of an inventive driver assistance system 6 is shown with reference to FIG. 1.

The vehicle 7, which comprises the driver assistance system 6 of one aspect, has a headlight system 2. The headlight system 2 is actuated by a control device 3. A variety of directional characteristics can thereby be produced with the headlight system 2. In addition to the known light functions for lighting up the environment in front of the vehicle 7 such as, for example, a dimmed beam function and a high beam function, the headlight system 2 is designed such that a light distribution having a particular characteristic can be produced. The characteristic of the light distribution is, in the present example, the color of the light distribution. It is therefore possible to produce a light distribution with a particular color with the headlight system 2. In order to produce this color, the headlight system 2 is actuated by the control device 3 such that it emits light of a wavelength by means of which the light distribution obtains the particular color.

In this case, the headlight system 2 comprises headlights which are configured completely as laser headlights, in which headlights all of the light functions which can be produced are produced by laser beams. The advantage of this is that the wavelength of a light emission 15 of the headlight system 2 is not dependent on components which can be mechanically modified such as, for example, color filters. In addition, the light emission 15 of the headlight system 2 can, as a result, be actuated in a fully variable manner and any colors can be produced for the light distribution.

In addition, the driver assistance system 6 comprises a determination unit 5. A probability of a collision with another traffic participant in the environment of the vehicle 7 can be determined by means of the determination unit 5.

To this end, it is detected by means of a detection unit 4 whether other traffic participants are located in the environment of the vehicle. The detection unit 4 can, in particular, comprise environment sensors such as e.g. radar sensors, LIDAR sensors, laser scanners, a mono camera or a stereo camera, ultrasonic sensors and/or PMD 2D or 3D sensors (photo mixing detectors), the output signals of which are transmitted to the determination unit 5. The detection unit 4 can, in this case, also be used in particular for other driver assistance systems. No separate environment sensors then have to be installed in the vehicle 7.

In this case, it has to be considered that the probability of a collision is based on the assumption that both the vehicle 7 and a detected traffic participant are executing a driving maneuver as planned.

The determined probability is assigned to a probability class. In this case, the probability classes are in particular based on possible traffic situations. If no other traffic participant is detected in the environment of the vehicle 7 the probability of a collision is low. The probability in such a situation is therefore assigned to a first probability class. In this case, the first probability class comprises probabilities of a collision within a range from 0% up to and including 5%. Since there is a risk that another traffic participant is located outside a detection space of the detection unit 4, there is always a residual risk of collision.

If, on the other hand, the detection unit 4 detects another traffic participant, the probability of a collision depends on a parameter which can be modified depending on the other traffic participant. This parameter can also be detected by the detection unit 4.

In this case, the parameter which can be modified depending on the other traffic participant can be produced, for example, directly by a device of the other traffic participant.

The parameter is, in this case, the distance between the first vehicle 7 and another traffic participant. If the distance of the other traffic participant from the vehicle 7 falls short of a specified value, a driving maneuver intended by the driver of the vehicle 7 can no longer be executed, without this resulting in a collision with the other traffic participant.

Alternatively, this parameter is a time following the end of which the result would be a collision with another traffic participant if the vehicle 7 executes the intended driving maneuver as planned. If the time falls short of a specified value, for example a value of 3 seconds, a driving maneuver intended by the driver of the vehicle 7 can no longer be executed, without this resulting in a collision with the other traffic participant.

In addition, the parameter can also comprise the direction of movement of the detected traffic participant. In this case, the direction of movement of the traffic participant is predicted and is included in the determination of the probability of a collision. In order to predict a direction of movement of the other traffic participant, the color and/or the frequency with which the vehicle of the other traffic participant emits a light emission can in particular be considered. This is finally modified, in particular, if the detected traffic participant would like to turn and indicates his intention to turn by signaling. Additionally or alternatively, the change in speed of the other traffic participant can also be detected. If the other traffic participant slows and signals at the same time, the probability of an intended turning maneuver of the detected traffic participant is rated higher than if only the speed is reduced or the vehicle merely signals. In particular, this results in the determination of whether the direction of movement of the other traffic participant intersects the future direction of movement of the vehicle 7.

The probability is determined depending on the parameter and is assigned to a second or third probability class. In this case, the probability is assigned to a second probability class if the distance exceeds a specified value, the detected traffic participant is therefore still a long way away, and/or the predicted direction of movement of the traffic participant does not intersect the direction of movement of the vehicle 7. The probability is assigned to a third probability class if the distance is equal to a specified value or falls short of this, and/or the predicted direction of movement of the traffic participant intersects the direction of movement of the vehicle 7.

In this case, the second probability class comprises probabilities of a collision within a range between 5% and up to and including 15%. The third probability class comprises probabilities of a collision of 15% up to and including 100%. The aim of this is to ensure that the driver does not execute a driving maneuver if the probability of a collision exceeds a certain value. For safety reasons this value is set very low at 15%.

The wavelength of the light emission 15 is then selected in accordance with the probability class, to which the determined probability has been assigned. The control device 3 controls the headlight system 2 such that a light emission 15 having a wavelength within a range of 790 nm to 630 nm is produced. As a result, the light distribution has a red color if the probability of a collision is assigned to the third probability class. If the probability is assigned to the first or the second probability class, a light emission 15 having a wavelength within a range between 560 nm and up to and including 480 nm is produced. The light distribution then has a green color. For the second probability class, a light emission 15 can alternatively have a wavelength within a range from 630 nm up to and including 560 nm. The light distribution then has an orange or yellow color.

If an initial light distribution, for example, a town light distribution or a dimmed light distribution is already emitted in a legally permitted white color, the wavelength of the light emission 15 is modified so that the color of the light distribution belonging to the probability class is produced. The form of the light distribution can, in this case, remain unaffected.

An exemplary embodiment of the inventive method and the light distributions 10 and 11 produced thereby will now be explained on the basis of a particular traffic situation with reference to FIGS. 2 to 6.

Figure 2:
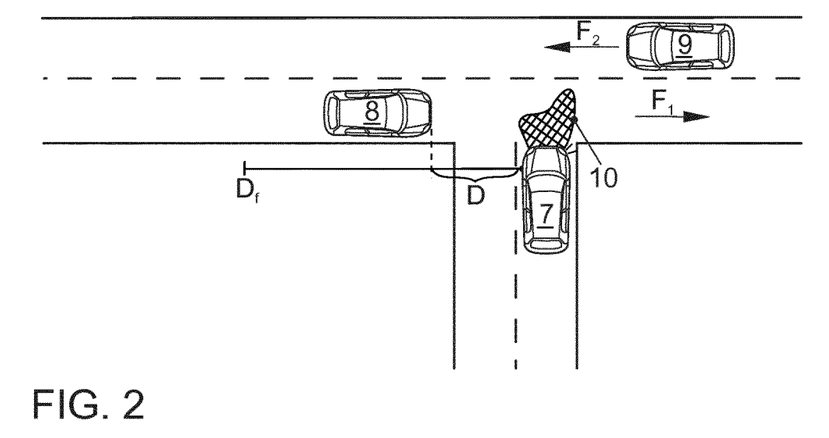
FIG. 2 to FIG. 6 show light distributions as they can be produced in a traffic situation by exemplary embodiments of the inventive method.

FIG. 2 shows a situation with three traffic participants 7 to 9, wherein the vehicle 7 has the inventive driver assistance system 6. The traffic participants 8 and 9 are, in this case, driving along a priority road in opposite directions $F_1$ and $F_2$. Located before the vehicle 8 on the right is a junction at which the vehicle 7 wishes to turn right onto the priority road. Since the vehicle 8 is located on the priority road, it has right of way and the vehicle 7 has to wait until the vehicle 8 has driven by.

In order to assist the driver of the vehicle 7 with the decision as to whether he continues the turning maneuver or waits until the vehicle 8 has driven past, it is first detected that the other traffic participants 8 and 9 are even on the priority road. It is then determined which driving maneuver the driver of the vehicle 7 would like to execute. As the right turn signal of the vehicle 7 is flashing, it is determined that the driver of the vehicle 7 would like to turn right. This means that the future direction of movement $F_1$, i.e. the direction of movement $F_1$ after executing the driving maneuver, is determined. The direction of movement $F_2$ of the vehicle 9 and the future direction of movement $F_1$ of the vehicle 7 do not, in this case, overlap at any time, the probability of a collision with the vehicle 9 is therefore classified in the second probability class.

On the other hand, the direction of movement $F_1$ of the vehicle 8 and the future direction of movement $F_1$ of the vehicle 7 do overlap. The distance D of the vehicle 8 from the vehicle 7 is determined. In the example shown in FIG. 2, the determined distance D falls short of a specified value $D_f$ which, in the present example, is 50 m. The probability of a collision if the driver of the vehicle 7 continues the turning maneuver is therefore assigned to the third probability level.

The headlight system 2 of the vehicle 7 is then actuated such that the color of the light distribution 10 produced on the roadway is red. In this case, the color red is taken by the driver of the vehicle 7 as a warning. As a result, it is made clear to the driver of the vehicle 7 that he should not execute the driving maneuver. Rather, he should wait until the vehicle 8 has driven past. In addition, the driver of the vehicle 8 will also perceive the red light distribution 10 on the roadway. He therefore expects the driver of the vehicle 7 to actually stop.

If, as in this example, more than one other traffic participant is detected, the characteristic of the light distribution is always produced such that it reflects the highest probability class determined. A red light distribution 10 is therefore produced on the roadway, although the probability of a collision with the traffic participant 9 has been assigned to the second probability class.

In addition to the color of the light distribution 10, a light signal 12 or 13 projected into the light distribution 10 can indicate to the driver of the vehicle 7 whether a driving maneuver can be executed or not. In this case, the light signal 12 or respectively 13 is selected depending on the wavelength of the light emission 15 or respectively the color of the light distribution 10.

Figure 3:
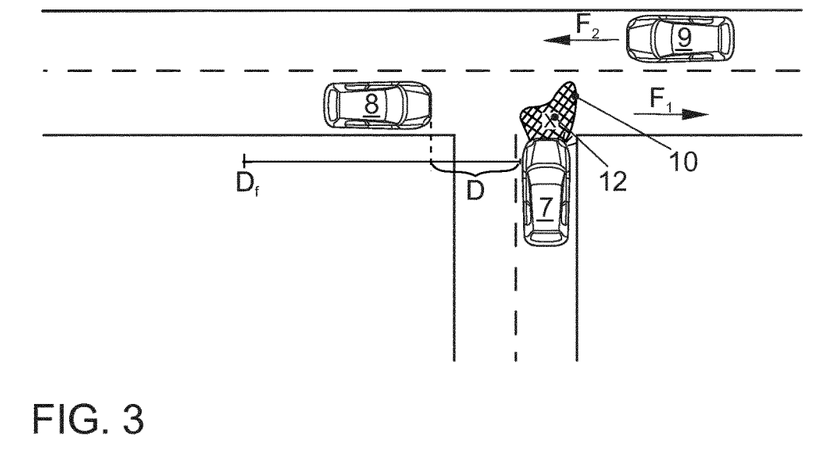

In the case of a red light distribution 10, a red cross is projected into the light distribution 10, as shown in FIG. 3.

The red cross 12 additionally illustrates to the driver of the vehicle 7 that the planned driving maneuver, namely the turning maneuver to the right, should not be executed.

Figure 4:
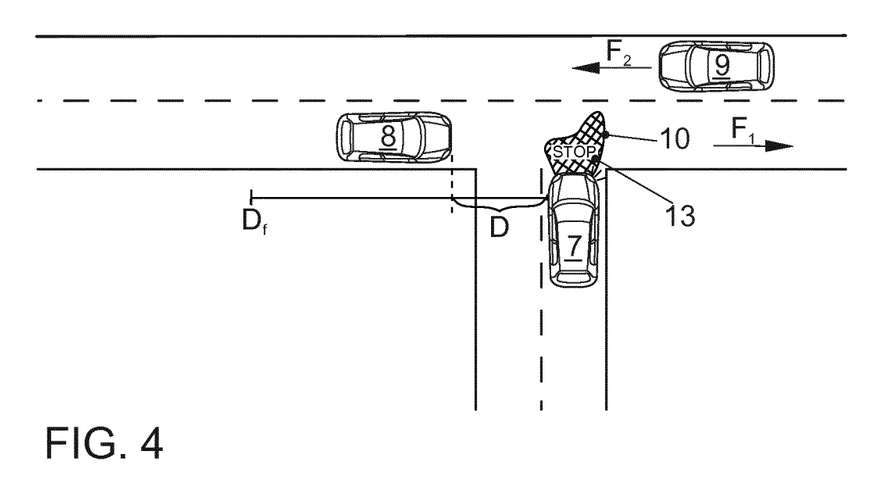

Alternatively, a writing 13 can also be projected into the light distribution 10 as shown in FIG. 4. In this case, the writing 13 "STOP" immediately makes it clear that the driver should stop the vehicle 7 and not execute the driving maneuver. Alternatively, the writing 13 can also form the word "WAIT" or "STOP".

The light signals 12 and 13 warn the driver of the vehicle against executing planned driving maneuvers.

Figure 5:
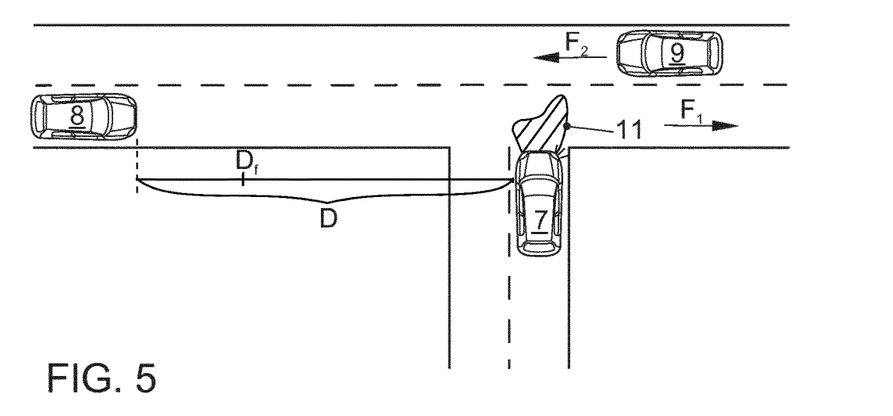

In FIG. 5, the distance D exceeds the specified value $D_f$. The probability of a collision is therefore categorized in the second probability class. The headlight system is then actuated such that a green light distribution 11 is produced on the roadway. It is therefore indicated to the driver of the vehicle 7 that the driving maneuver can still be executed, without this resulting in a collision with the vehicle 8.

Alternatively, an orange or yellow light distribution is produced on the roadway in the case of the second probability class. This indicates to the driver that the driving maneuver can indeed be executed although this is associated with risks.

If no other traffic participant 8 or 9 is detected, the probability is assigned to the first probability class and a green light distribution 11 is likewise produced on the roadway.

Figure 6:
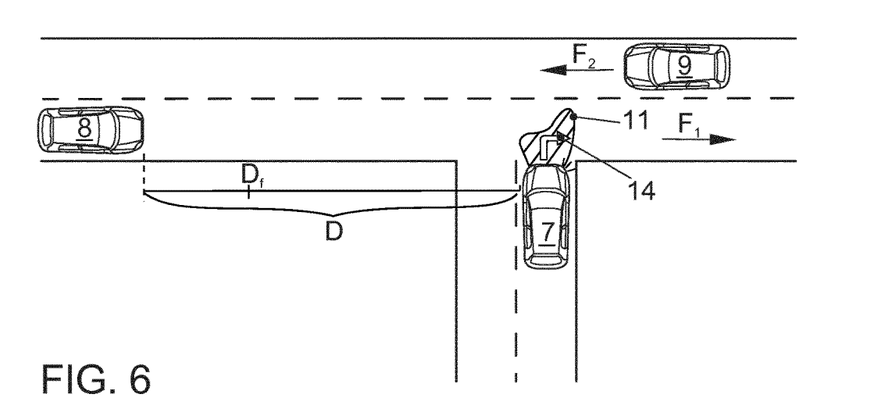

In addition, a light symbol 14 is projected into the green light distribution 11 as a function of the color green. The light signal 14 is, in this case, a green turning arrow. As a result, the driver is given the instruction to carry out the turning maneuver. This is shown in FIG. 6.

If an orange or yellow light distribution is produced for the second probability class, a light signal 12 or 13, which represents a warning against executing the planned driving maneuver, is projected into the light distribution.

Alternatively, in the case of an orange or yellow light distribution, the light signal 14 can also be projected into the light distribution. However, in order to make it clear that the driver of the vehicle 7 should be particularly careful on executing the planned turning maneuver, this can be dynamically modified, therefore flash for example.

The inventive method is, in particular, configured to assist the driver during a particular driving maneuver. However, this does not release the driver from the obligation to check again for himself whether the driving maneuver can actually be executed without risk even in the case of a green light distribution 11.

Figure 7:
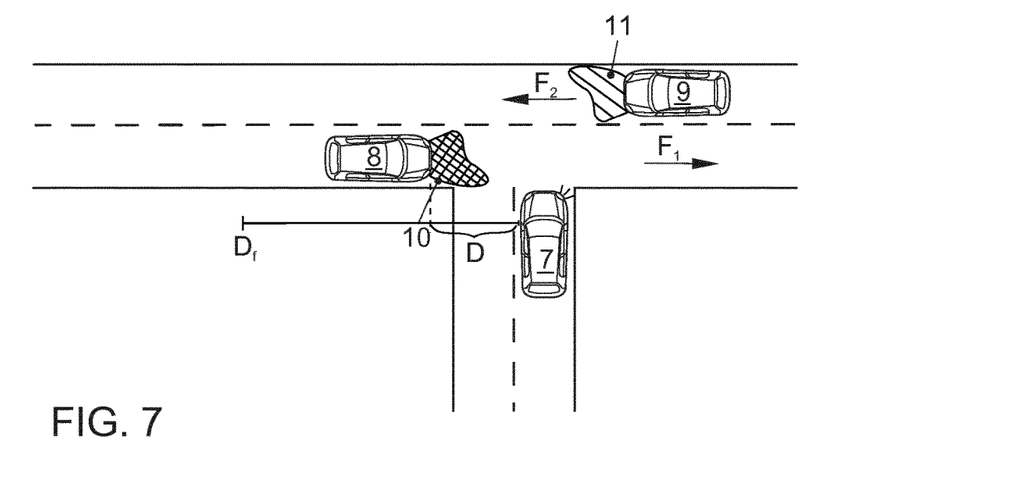
FIGS. 7 and 8 show light distributions as they can be produced by a further exemplary embodiment of the inventive method.

A further exemplary embodiment of the inventive method is explained with reference to FIGS. 7 and 8.

In this case, the vehicles of the traffic participants 8 and 9 are equipped with an inventive driver assistance system 6.

The vehicle 7 is, in this case, detected by both vehicles of the traffic participants 8 and 9. In addition, it is detected by both vehicles of the traffic participants 8 and 9 that the vehicle 7 wishes to turn right, the future direction of movement of the vehicle 7 is therefore the direction of movement $F_1$. This does not represent a danger for the vehicle 9. The headlight system 2 of the vehicle 9 therefore produces a green light distribution 11.

On the other hand, it is identified by the vehicle 8 that on turning the vehicle 7 intersects the direction of movement $F_1$ of the traffic participant 8. The distance D from the vehicle 7 is therefore determined first of all. In FIG. 7, the determined distance falls short of a specified value $D_f$ of 50 m. The vehicle 8 therefore produces a red light distribution.

This is regarded as a signal for the driver of the vehicle 7 not to continue the turning maneuver until the vehicle 8 has driven past.

Figure 8:
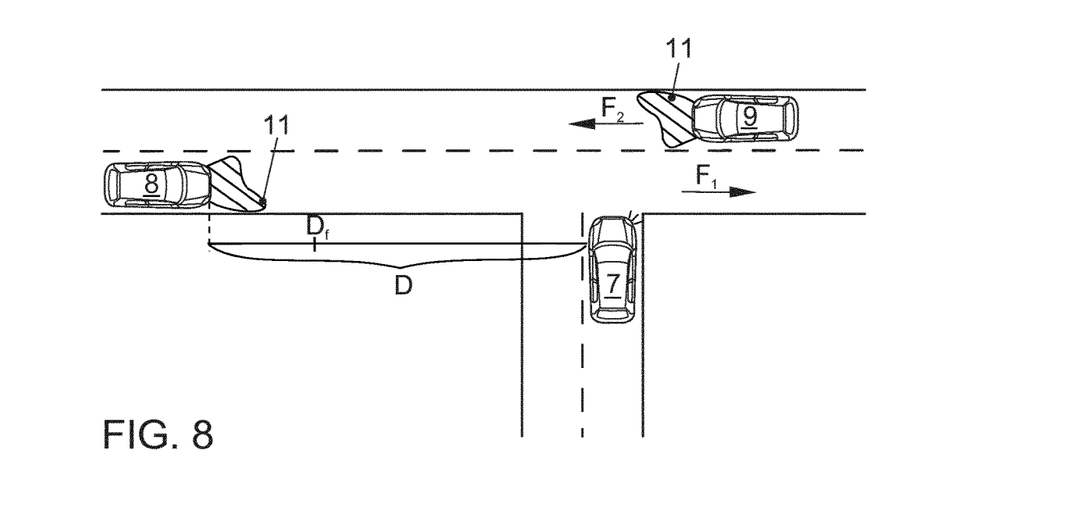

In FIG. 8 it is determined that distance D exceeds the specified value $D_f$. The light distribution 11 of the vehicle 8 is therefore green. This indicates to the driver of the vehicle 7 that he can still perform the planned turning maneuver.

In both exemplary embodiments the specified value $D_f$ for the distance D can be stored in the driver assistance system as a function of the speed of the traffic participant 8. In this case, in the first exemplary embodiment, the speed of the traffic participant 8 is measured by a sensor of the vehicle 7, while this is in any case known to the vehicle of the traffic participant 8 in the second exemplary embodiment. The specified value is then all the smaller the lower the detected speed of the traffic participant 8 is.

LIST OF REFERENCE NUMERALS

1 Laser projection unit
2 Headlight system
3 Control device
4 Detection unit
5 Determination unit
6 Driver assistance system
7 Vehicle
8, 9 Traffic participant
10 Light distribution
11 Light distribution
12 to 14 Light signal
D Distance
$F_1$ Direction of movement, future direction of movement
$F_2$ Direction of movement
$D_f$ Specified value Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method for assisting a driver of a vehicle, wherein an initial light distribution is generated;
   a probability of a collision with another traffic participant in the environment of the vehicle is determined, wherein the determined probability is assigned to a probability class;
   a light emission, which produces a light distribution having a characteristic reflecting the probability class on a roadway, is emitted by the vehicle in accordance with the probability class; wherein
   if no other traffic participant is detected in the environment of the vehicle, the probability of a collision is assigned to a first probability class and if another traffic participant is detected in the environment of the vehicle, the probability of a collision as a function of a parameter which is modified depending on the other traffic participant is assigned to a second and/or a third probability class;

the characteristic of the light distribution is produced by a wavelength of the light emission so that the characteristic of the light distribution is its color;

the wavelength of the light emission of the initial light distribution is modified if the determined probability is assigned to the second or third probability class, so that the color of the light distribution belonging to the second or third probability class is produced; and wherein the wavelength of the light emission of the initial light distribution is modified if the determined probability is assigned to the first probability class, so that the color of the light distribution belonging to the first probability class is produced if no other traffic participant is detected in the environment of the vehicle.

2. The method according to claim 1, wherein the parameter comprises a distance of the detected traffic participant from the vehicle, wherein the probability of a collision is assigned to the second probability class if the distance is greater than a specified value, and/or is assigned to the third probability class if the distance is smaller than or equal to the specified value.

3. The method according to claim 1, wherein the parameter comprises the direction of movement of the detected traffic participant, wherein it is determined whether a predicted direction of movement of the detected traffic participant intersects the future direction of movement of the vehicle if it is determined that the predicted direction of movement of the detected traffic participant does not intersect the future direction of movement of the vehicle, the probability is assigned to the second probability class, and if it is determined that the predicted direction of movement of the detected traffic participant intersects the future direction of movement of the vehicle, the probability is assigned to the third probability class.

4. The method according to claim 1, wherein the light emission has a first wavelength, with which a light distribution is produced on a roadway with a first color if the probability of a collision has been assigned to the first probability class, the light emission has a second wavelength, with which a light distribution is produced on a roadway with a second color if the probability of a collision has been assigned to the second probability class, and the light emission has a third wavelength, with which a light distribution is produced on a roadway with a third color if the probability of a collision has been assigned to the third probability class.

5. The method according to claim 4, wherein the first color is green, the second color is green, yellow or orange and the third color is red.

6. The method according to claim 4, wherein a light signal is projected into the light distribution, wherein the projected light signal depends on the color of the light distribution.

7. The method according to claim 6, wherein the light signal represents an instruction to execute a driving maneuver if a green light distribution is produced on the roadway, and the light signal represents a warning prior to executing the driving maneuver if an orange, yellow or red light distribution is produced on the roadway.

8. The method according to claim 1, wherein the light emission has a first wavelength, with which a light distribution is produced on a roadway with a first color if the probability of a collision has been assigned to the first probability class, the light emission has a second wavelength, with which a light distribution is produced on a roadway with a second color if the probability of a collision has been assigned to the second probability class.

9. The method according to claim 1, wherein the light emission has a third wavelength, with which a light distribution is produced on a roadway with a third color if the probability of a collision has been assigned to the third probability class.

10. The method according to claim 1, wherein the parameter comprises a distance of the detected traffic participant from the vehicle, wherein the probability of a collision is assigned to the second probability class if the distance is greater than a specified value.

11. The method according to claim 1, wherein the parameter comprises a distance of the detected traffic participant from the vehicle, wherein the probability of a collision is assigned to the third probability class if the distance is smaller than or equal to the specified value.

12. A driver assistance system for assisting a driver of a vehicle, having a determination unit, configured to determine a probability of a collision with another traffic participant in the environment of the vehicle, and configured to assign the determined probability to a probability class;

a headlight system for generation of an initial light distribution; and a control device, configured to actuate the headlight system in accordance with the probability class so that a light emission, which produces a light distribution having characteristics reflecting the probability class, is emitted;

a detection unit, configured to detect whether another traffic participant is located in the environment of the vehicle; wherein the probability of a collision is assignable to a first probability class with the determination unit, if no other traffic participant is detected in the environment of the vehicle; and/or the probability of a collision as a function of a parameter which is modified depending on the other traffic participant is assignable to a second and/or third probability class with the determination unit if another traffic participant is detected in the environment of the vehicle;

the headlight system is configured to emit a light emission of a wavelength in accordance with the probability class, so that the characteristic of the produced light distribution comprises its color;

the wavelength of the light emission of the initial light distribution is modified if the determined probability is assigned to the second or third probability class, so that the color of the light distribution belonging to the second or third probability class is produced; and wherein the wavelength of the light emission of the initial light distribution is modified if the determined probability is assigned to the first probability class, so that the color of the light distribution belonging to the first probability class is produced if no other traffic participant is detected in the environment of the vehicle.

13. The driver assistance system according to claim 12, wherein the headlight system comprises a laser projection unit.

14. A vehicle having a driver assistance system according to claim 12.

\* \* \* \* \*